United States Patent [19]

D'Orazio et al.

[11] 3,898,689

[45] Aug. 5, 1975

[54] CODE CONVERTER

[75] Inventors: Robert Joseph D'Orazio, Jackson, N.J.; Gerald Steven Soloway, Brooklyn, N.Y.

[73] Assignee: Bell Telephone Laboratories, Incorporated, Murray Hill, N.J.

[22] Filed: Aug. 2, 1974

[21] Appl. No.: 494,030

[52] U.S. Cl. .......... 360/40; 235/61.11 D

[51] Int. Cl. .......... G11b 5/09; G06k 7/08

[58] Field of Search .......... 235/61.11 D, 61.11 E; 360/39, 40, 44, 51

[56] References Cited

UNITED STATES PATENTS

| | | | |
|---|---|---|---|
| 3,720,927 | 3/1973 | Wolf | 360/44 |
| 3,763,351 | 10/1973 | Deerhake | 235/61.11 E |
| 3,794,812 | 2/1974 | Bryant | 235/61.11 E |
| 3,796,862 | 3/1974 | Asija | 235/61.11 E |

*Primary Examiner*—Daryl W. Cook

*Attorney, Agent, or Firm*—Barry H. Freedman

[57] ABSTRACT

A bitstream encoded in the Aiken or similar self-clocking code is converted to a binary waveform with clocking by apparatus including two spaced apart sensing devices which read the bitstream, a memory circuit for storing the data content of the portion of the bitstream disposed between the sensing devices, and logic circuitry jointly responsive to the memory and sensing devices for determining the data content of the present bit. Timing information is extracted from the bitstream by another logic circuit jointly responsive to the output of one sensing device and to the memory circuit.

The apparatus permits conversion independent of reading speed variations.

12 Claims, 12 Drawing Figures

CODE CONVERTER

BACKGROUND OF THE INVENTION

1. Field of the Invention

This invention relates generally to code conversion apparatus and, more particularly, to such apparatus for converting a bitstream or coded sequence of bits containing both timing information and data into two separate bitstreams, one containing data and the other containing only timing information.

2. Description of the Prior Art

Various self-clocking encoding schemes have been devised in which a signal containing both data and timing information is represented by a single binary bitstream, which, at least ideally, can assume one of two possible levels or states, and which, of course, includes transitions between the states. A magnetic medium can be used for storage of the bitstream, the data and timing information being represented by a series of transitions between distinct magnetization states, or the bitstream can be represented graphically in a bar code.

One particular self-clocking encoding scheme that has found wide acceptance is the Aiken or two frequency coherent phase code. The characteristics of the electrical representation of this code are as follows: A transition between the two possible levels or states of the signal occurs regularly at the beginning and end of each bit interval; an irregular transition occurring intermediate to the regular transitions indicates one output data state, while the absence of such an irregular transition indicates the other or second output data state. Thus, it can be said that the data carried by a bitstream encoded in the Aiken code is contained in the irregular transitions, while the timing information essential to extracting the data is contained in the regular transitions.

In many applications, it is necessary to convert the Aiken code into another format, such as a binary waveform with clocking, for processing purposes. To accomplish this conversion, a decoder is required to generate a first or data bitstream which is characterized by a first state or level in the presence of data and a second state or level in the absence of data, and a second or timing bitstream which is required to properly interpret the data bitstream. Thus, the regular transitions must be separated from the irregular transitions.

Prior art decoders that perform the above described conversion are relatively simple to implement, if the Aiken code is read at a uniform rate. For example, an accurate clock or timer can be used to determine the proper time within a bit interval to check for the presence or absence of an irregular transition. If, on the other hand, the Aiken code is read or scanned at a nonuniform rate, as would be the case where a hand operated reader is used, a clock is of no use, and another approach is generally required. This approach may, for example, use the width of the preceding bit as a basis for establishing an appropriate viewing window for the present bit. By so doing, the decoder can still function properly despite moderate changes in reading speed between adjacent bits; however, this type of reader requires complicated and costly logic circuitry, and does not operate properly under certain reading conditions involving acceleration and deceleration.

In view of the foregoing, it is the broad object of the present invention to provide improved code conversion apparatus for converting a bitstream encoded in the Aiken or similar self-clocking code, into two separate bitstreams, one containing data and the other containing only timing information. Specific objects include the provision of such a code converter or decoder that operates independently or nearly so, of changes in reading speed and that requires only simple and thus inexpensive logic circuitry.

SUMMARY OF THE INVENTION

Each of the foregoing and additional objects are achieved in accordance with the principles of the instant invention by a code conversion apparatus which includes two reading heads spaced a fixed distance apart and arranged to simultaneously sense the bitstream being converted, and logic circuitry for "correlating" the head outputs and the portion of the bitstream between the heads so as to provide separate readouts of timing information and data, the latter being presented in a different format from the input bitstream. More specifically, the logic circuitry includes a register, memory or information store for counting and remembering the content of the portion of the bitstream disposed between the reading heads, and decisional circuitry responsive to the register and the outputs of the two reading heads for generating the first output bitstream containing only data. The latter output, in conjunction with the output of one of the reading heads is used to generate the second output bitstream containing only timing information.

By virtue of the advantageous arrangement described above, which makes use of the fixed density of the bitstream being read or converted, the apparatus operates satisfactorily at different reading speeds and varying accelerations. In addition, where the reading heads are closely spaced, for example, one bit length apart, the memory required is minimal, and the logic circuitry is thus both simple and inexpensive.

BRIEF DESCRIPTION OF THE DRAWING

Further features and advantages of the instant invention will be more fully appreciated from the following detailed description when read in light of the accompanying drawing in which:

FIG. 1, comprising

DETAILED DESCRIPTION

Figures 1A, 1B, 1C, 1D, 1E, 1F, 1G, 1H:
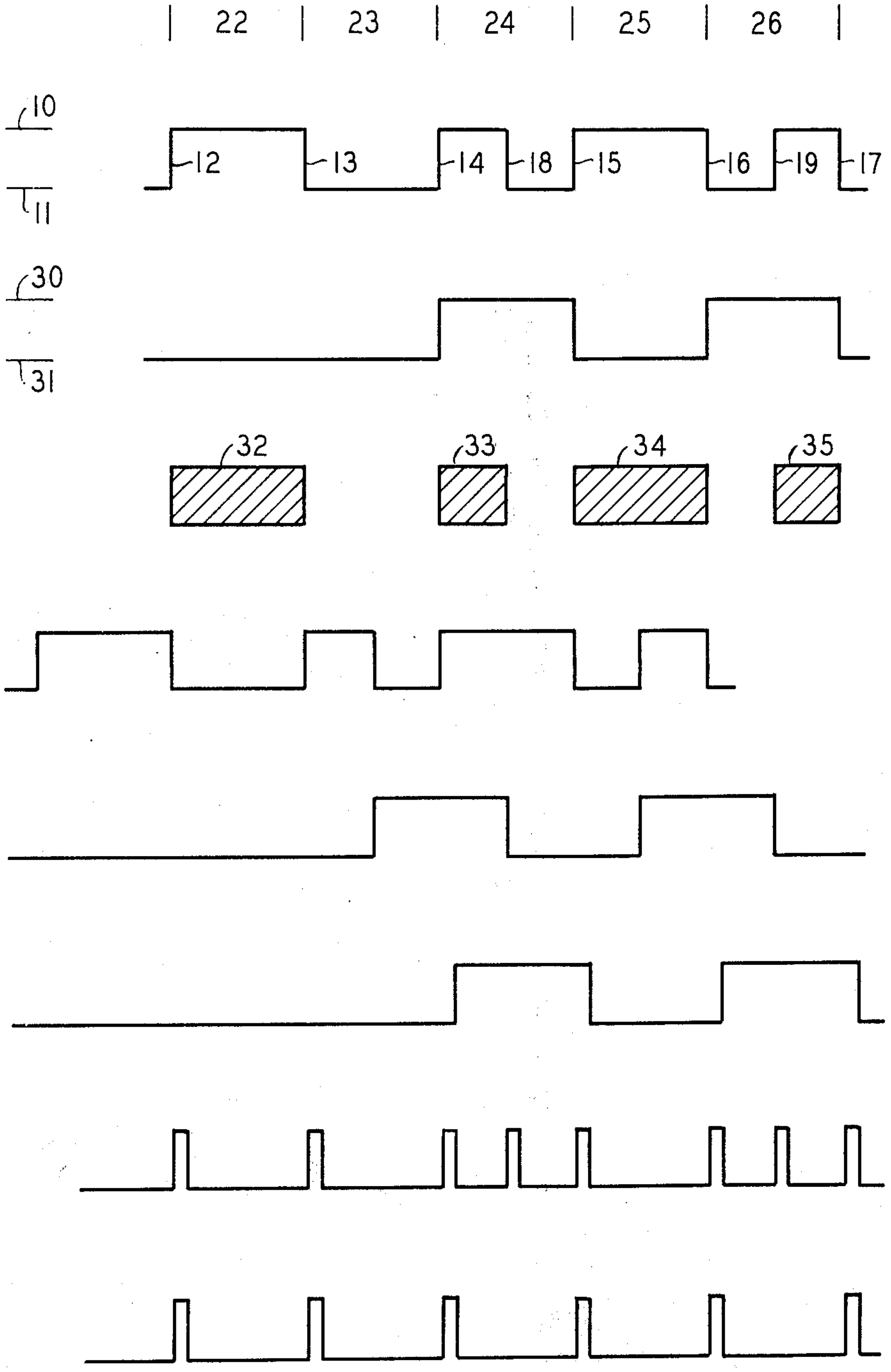
FIGS. 1A–1H, is a representation of the waveforms present at various points in a code converter constructed in accordance with the principles of the instant invention, such as the converter of FIG. 2.

Referring first to FIG. 1A, there is shown a waveform representative of a bitstream encoded using the Aiken code. As can be seen therefrom, the waveform can assume first or second levels 10 and 11, respectively, and includes regular transitions 12, 13, 14, 15, 16, 17 between the levels at the beginning and end of each bit interval 22, 23, 24, 25, 26 in the bitstream. Irregular transitions, such as transitions 18 and 19 can occur intermediate the beginning and end of a particular bit interval, as shown in bit intervals 24 and 26, respectively.

The presence or absence of an irregular transition within a bit interval is indicative of the data carried by the bitstream. Thus, intervals 24 and 26 can be considered as binary "ones" and intervals 22, 23 and 25 can be considered as binary "zeroes," in which case the bitstream shown in FIG. 1A may be read from left to right as 00101. Alternatively, intervals 24 and 26 can be considered as binary "zeroes" and intervals 22, 23 and 25 can be considered as binary "ones,"in which case the bitstream is read as 11010. In the former event, the data carried by the bitstream of FIG. 1A is converted by apparatus in accordance with the present invention to the waveform shown in FIG. 1B, wherein first and second output levels 30 and 31 indicate binary "ones" and "zeroes," respectively. In the latter event, the bitstream of FIG. 1A would, of course, be converted to the inverse of the waveform of FIG. 1B. However, in either case, the waveform of FIG. 1B (or its inverse), often referred to as a straight binary code, would be insufficient, standing alone, to completely define the bitstream. Also required is timing information, that defines the bit intervals 22–26, so that the waveform of FIG. 1B can be properly integrated as 00101. This timing information, as will be described more fully hereinafter, is also extracted from the waveform of FIG. 1A. Accordingly, that waveform is said to be "self-clocking."

It is to be noted that the bitstream corresponding to the waveform of FIG. 1A can be stored on a magnetic medium, or can be represented in other ways. For example, a graphical bar code, as shown in FIG. 1C can be used, with dark areas 32–35 corresponding to the portions of the waveform of FIG. 1A that are at level 10, and light areas between the dark areas of course corresponding to the portions of the waveform of FIG. 1A that are at level 11. Alternatively, the light ad dark areas can be interchanged, without loss of any information. In any event, an electrical waveform like that shown in FIG. 1A is the input signal that is converted by apparatus designed in accordance with the instant invention.

Figure 2:
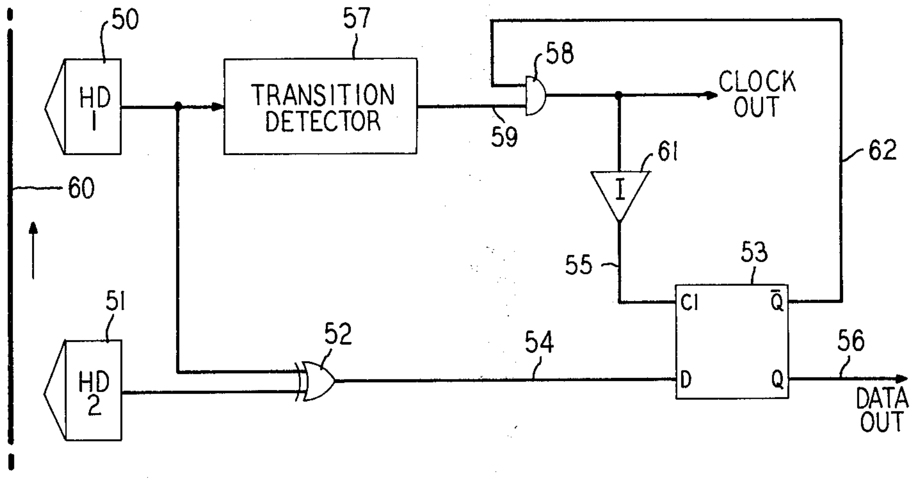
FIG. 2 is a schematic diagram of one embodiment of a code converter constructed in accordance with the principles of the instant invention.

Referring now to FIG. 2, there is shown apparatus for converting the bitstream of FIG. 1A to the bitstream of FIG. 1B, and for providing the timing information needed to define bit intervals. The apparatus includes first and second sensing devices 50 and 51 which are spaced apart a fixed distance along an axis; the prescribed distance is assumed to be one bit length in FIG. 2. In the case where the bitstream is carried on magnetic tape or a similar medium, sensing devices 50 and 51 may be conventional magnetic reading heads, with associated amplifiers, (not shown) if needed. If the bitstream is represented by a bar code, sensing devices 50 and 51 can be photo cells with associated light sources and amplifiers, if required. Details of one particularly advantageous construction of sensing devices is contained in the copending application of Glen E. Moore, Jr., Ser. No. 494,031, filed simultaneously herewith. The sensing devices are arranged to simultaneously read the bitstream carried by the medium 60, as the medium is moved past the devices, or vice-versa, along the axis. If the medium 60 is moved along the axis in the direction of the arrow, the output from sensing device 51 is advanced or leads the output of sensing device 50 by one bit length, as shown in FIG. 1D. Both outputs are applied to the inputs of an exclusive NOR gate 52, whose output goes high, as shown in FIG. 1E, when the inputs to gate 52 are both at the same level. The output of gate 52 is applied to the data input 54 of a flip-flop or register 53 which receives a timing indication at its clock input 55 at each occurrence of a regular transition in the input bitstream, as will be described more fully hereinafter. Accordingly, as will be understood by those skilled in the art, the data or Q output 56 of register 53 produces the waveform shown in FIG. 1F, (almost identical to the waveform of FIG. 1B) which represents the data carried in the input bitstream, converted to the desired straight binary code.

Timing information is extracted from the input bitstream by first applying the output of sensing device 50 to a transition detector 57, to obtain a series of pulses shown in FIG. 1G at each transition between levels 10 and 11, both regular and irregular. Detector 57 may comprise a differentiator which is arranged to trigger a monostable multivibrator, so that only positive going timing pulses are produced; other constructions of detector 57 will be readily apparent to those skilled in the art. The timing pulses so obtained are applied to one input 59 of AND gate 58, the other input 60 of which is supplied from the $\bar{Q}$ or inverted output of register 53. As will be seen from inspection of FIGS. 1G and 1F, the resulting timing or clock pulses present at the output of gate 58, shown in FIG. 1H, occur only at regular transitions 12–17 of the input bitstream, irregular transitions 18 and 19 are eliminated from the clock output because the input 60 to gate 58 is low at these times. The clock pulses are applied to inverter 61 and the resulting pulse train is used as the clock input 55 of register 53. As will be understood by those skilled in the art, the clock input of register 53 is effective to render the data (Q) output of the register the same as the data (D) input thereto; only on the occurrence of a low to high transition of the clock signal.

From the foregoing description, it will be appreciated that the code converter of FIG. 2 permits conversion of a self-clocking bitstream encoded using the Aiken code into separate bitstreams containing data and timing information, and requires only simple logic circuitry that does not depend upon an accurate bit interval clock or other means for maintaining a constant reading speed.

Before proceeding with a description of another embodiment of the present invention, it may be useful to understand the basic principle of operation. For this purpose, consider that sensing device 50 is being continually monitored for transitions. When a transition is detected, the level 10 or 11 presnt at both sensing devices 50 and 51 is read. By inspecting FIGS. 1A and 1D, it is seen that opposite levels indicate a "zero" while the same levels indicate a "one." There is only one more consideration to properly complete this analysis: since a "one" bit in the input bitstream also contains an irregular transition when a decision output is not desired, such transitions must be ignored. This is accomplished via the action of register 53, the $\bar{Q}$ output of which goes low in the presence of a "one" bit, thereby blocking the passage of transition pulses through gate 58.

The instant invention is not limited to a one bit spacing between sensing devices 50 and 51. Rather, the aforedescribed technique can be extended so that the devices are positioned any desired number of bit lengths apart, including fractions of bit lengths. For example, referring to FIG. 3, there is shown apparatus for reading or converting the input bitstream into a straight binary bitstream wherein sensing devices 101 and 102 are spaced 4¾ bit lengths apart. Device 101 is connected to transition detector 103 which, as before, produces an output pulse on line 104 at each input level transition, both regular and irregular. After each transition, the output of both sensing devices is examined. However, it is now of importance to know the states of the previous four bits, i.e., the portion of the input bitstream between the two sensing devices, in order to make a decision. There are four cases to consider: If the previous four bits contain an even number of "ones," a "zero" is detected if the levels sensed by devices 101 and 102 are different and a "one" is detected if the levels are alike. If the previous four bits contain an "odd" number of "ones," a "zero" is detected if the levels sensed by devices 101 and 102 are alike, and a "one" is detected if the levels are different. Stated differently, for the 4¾ bit spacing used in the apparatus of FIG. 3, the desired logical operation is that a "one" is detected if the total number of "one" bits contained in the portion of the input bitstream disposed between the sensing devices added to the number of sensing device outputs that are also high (at level 10) is even, and a "zero" is detected otherwise (i.e., if the total number of "one" bits plus the number of high sensing device outputs is odd).

Figure 3:
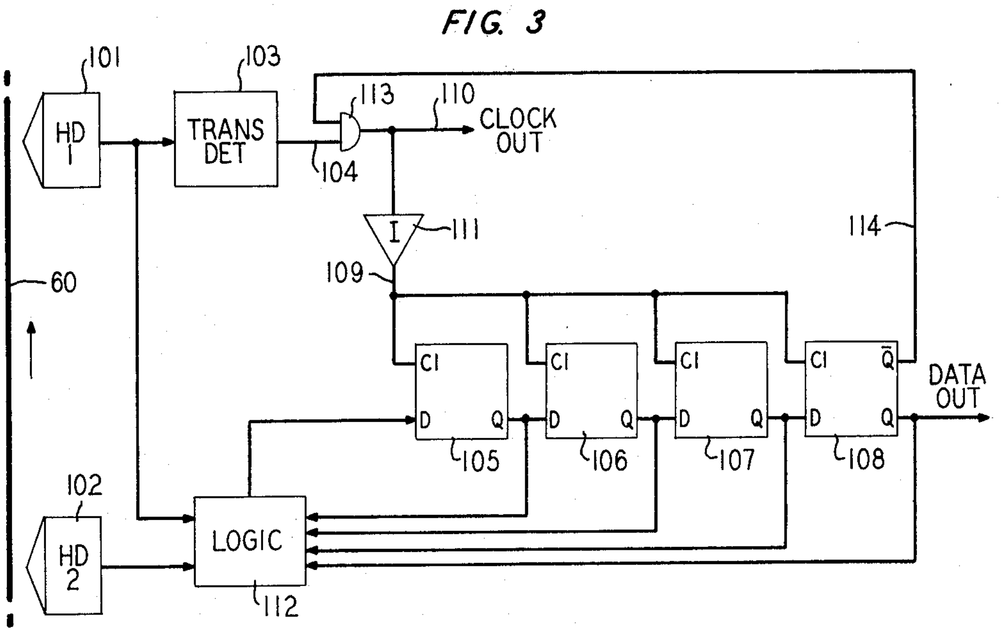
FIG. 3 is a schematic diagram of another embodiment of the invention.

To accomplish the above detection, a four bit shift register having stages 105, 106, 107, and 108 is serially arranged with the data or Q output of stage 105 being connected to the data or D input of the succeeding stage 106, and so on. The clock input terminals of each stage are connected in common at line 109, which receives inverted timing signals from line 110 via inverter 111. Stages 105–108 of the register act as a memory or information store in that the levels present at the Q output terminals of each stage represent the data content of the portion of the input bitstream disposed between sensing devices 101 and 102. These outputs are connected, along with the outputs of sensing devices 101 and 102, to the inputs of a logic circuit 112, (described hereinafter) which is arranged to act as an odd-even detector. The logic performs the aforedescribed logical operation, namely, it produces a high or "one" bit output when the total number of high inputs thereto is even. The output of logic 112 is connected to the data input of register stage 105. Since each stage 105–108 of the register of FIG. 3 contains the data present in input bitstream being converted, the data output in the desired straight binary code can be taken from the Q output of any stage. As shown in FIG. 3, the data output is obtained from the Q output of stage 108.

Timing information is extracted as before, by applying the output of transition detector 103 on line 104 to one input terminal of an AND gate 113, the other input terminal 114 of which is connected to the inverted or $\bar{Q}$ output of register stage 108. Thus, as medium 60 carrying the input bitstream is moved past sensing devices 101 and 102 in the arrow direction shown in FIG. 3, a particular bit is scanned by device 101 at the same time that its data counterpart is in register stage 108, so that the irregular transition in a "one" bit is blocked from passage through gate 113 because the $\bar{Q}$ output of stage 108 is then low. Stated differently, register stages 105–107 delay the data stream sufficiently so that the data bit corresponding to a particular input bit sensed by detector 102 reaches and activates stage 108 at the same time that the same input bit is sensed by detector 101. The Q output of stage 108 provides the output data stream; the $\bar{Q}$ output thereof is used to generate the clocking signal.

Figure 4:
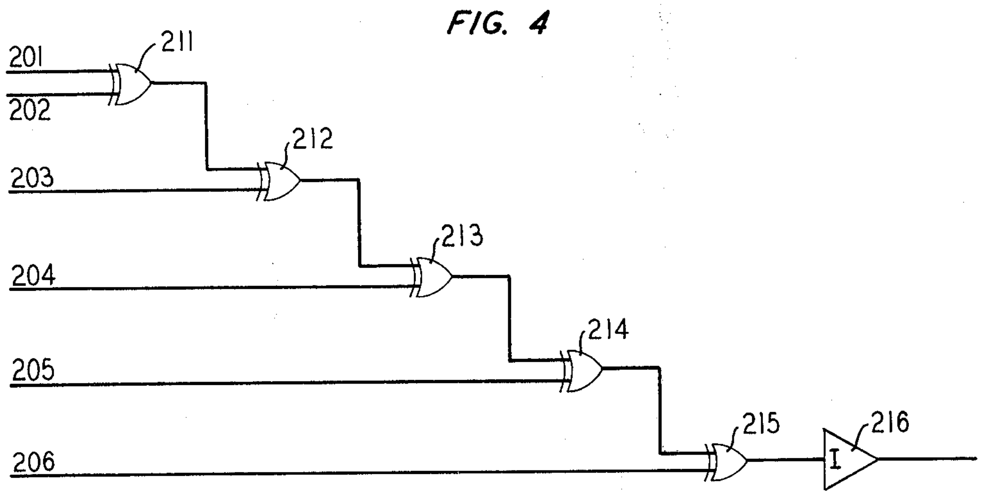
FIG. 4 is a schematic diagram of the logic portion of the apparatus of FIG. 3.

Referring now to FIG. 4, there is shown one simple implementation of the odd-even detector (logic 112) of FIG. 3. The detector includes five "exclusive OR" gates 211–215 connected in a chain-like fashion such that two inputs 201 and 202 are connected to the gate 211, the output of gate 211 and the third input 203 are connected to gate 212, the output of gate 212 and the fourth input 204 are connected to gate 213, and so on. An inverter 216 is connected at the output of gate 215. It will be readily appreciated by those skilled in the art that the output of the detector, taken at the output of inverter 216, will be high only when an even number of inputs 201–206 are high, and of course low when an odd number of inputs are high. It will also be understood that the number of "exclusive OR" gates required is equal to the maximum number of irregular transitions that can be contained in the portion of the bitstream between the first and second sensing devices.

Having thus fully described several embodiments of the present invention, it should be understood that in accordance with the principles thereof, successful results can be achieved with any desired spacing of the two sensing devices, as long as the memory used for determining and storing the data content of the portion of the input bitstream disposed between the sensing devices, as represented by the maximum possible number $n$ of irregular transitions that can be contained in that portion, is of sufficient capacity. Specifically, the memory requires an $n-1$ bit capacity for $n=2$ or more, and a one bit capacity for $n=1$, which is a special case. It is also to be noted that different arrangements of the logic circuitry, which is jointly responsive to the memory and to the outputs of the sensing devices, is required for different spacings. For an $s$ bit sensing device spacing such that $m-1<s<m$ where $m$ is an odd integer, the logic should be arranged to include an inverter so as to produce a high output if the total number of high inputs thereto is even. On the other hand, if $m$ is an even integer, the logic should be arranged to produce a high output if the total number of high inputs thereto is odd. The foregoing relationships between the sensing device spacing, the number of memory stages required, and the makeup of the logic circuitry is summarized in the following table:

| Spacing "s" between sensing devices in bits | Maximum number "n" of irregular transitions between sensing devices | Memory stages required | Number of exclusive OR gates required | Inverter Needed |
|---|---|---|---|---|
| ½<s<1 | 1 | 1 | 1 | Yes |
| 1<s<1½ | 1 | 1 | 1 | No |
| 1½<s<2 | 2 | 1 | 2 | No |
| 2<s<2½ | 2 | 1 | 2 | Yes |
| 2½<s<3 | 3 | 2 | 3 | Yes |
| 3<s<3½ | 3 | 2 | 3 | No |
| 3½<s<4 | 4 | 3 | 4 | No |

CONTINUED

| Spacing "s" between sensing devices in bits | Maximum number "n" of irregular transitions between sensing devices | Memory stages required | Number of exclusive OR gates required | Inverter Needed |
|---|---|---|---|---|
| $4<s<4\frac{1}{2}$ | 4 | 3 | 4 | Yes |
| $4\frac{1}{2}<s<5$ | 5 | 4 | 5 | Yes |
| $5<s<5\frac{1}{2}$ | 5 | 4 | 5 | No |
| $n-\frac{1}{2}<s<n$ | n=even | n−1 | n | No |
| $n<s<n+\frac{1}{2}$ | n=even | n−1 | n | Yes |
| $n-\frac{1}{2}<s<n$ | n=odd | n−1 | n | Yes |
| $n<s<n+\frac{1}{2}$ | n=odd | n−1 | n | No |

Figure 5:
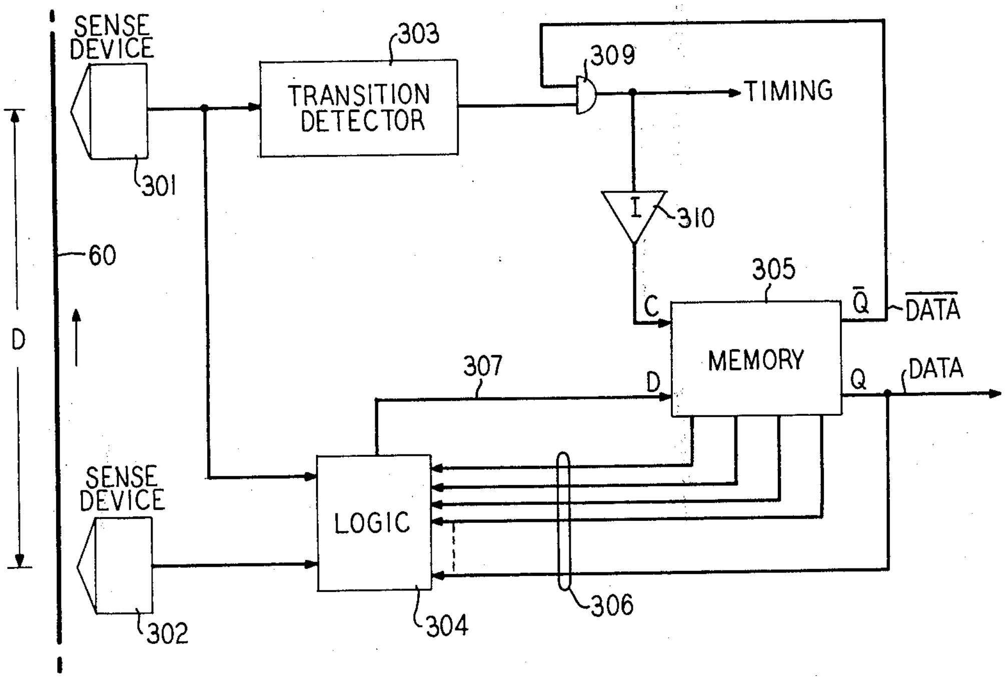
FIG. 5 is a more generalized block diagram of a code converter constructed using the principles of the present invention.

Referring now to FIG. 5, a generalized block diagram of a code converter constructed in accordance with the instant invention is shown. The converter includes sensing devices 301 and 302 spaced apart a fixed distance D, a transition detector 303 connected to the output of device 301, a logic circuit 304 and a memory 305. The memory stores the number of irregular transitions contained in the portion of the input bitstream between the sensing devices and supplies this information on lines 306 to logic circuit 304, which is also responsive to the sensing devices. The logic determines the state of the present bit, and applies this output indication to the data input of memory 305 on line 307. Timing information is extracted by combining the output of detector 303 with the inverted data output of memory 305 in AND gate 309. The timing information so obtained is inverted in inverter 310 and supplies the clock input of memory 305.

Many modifications and adaptations of the instant invention will be readily apparent to those skilled in the art. Therefore, it is intended that the invention be limited only by the appended claims.

What is claimed is:

1. Apparatus for reading a binary bitstream having a first level and a second level and wherein regular transitions between said first and second levels occur at the beginning and end of each bit interval and wherein the presence or absence of irregular transitions between said first and second levels occurring intermediate the beginning and end of each of said bit intervals are representative of the data carried by said bitstream, comprising first and second sensor means spaced apart a fixed distance $s$ and adapted to simultaneously sense the level of said bitstream thereat, detector means responsive to said first sensor means adapted to provide an indication at each of said regular and irregular transitions between said first and seond levels, memory means for determining the number of irregular transitions occurring in the portion of said bitstream between said first and second sensor means, and logic means jointly responsive to said first and second sensor means and said memory means for a. providing a first output indication if the levels sensed by said first and second means are the same and said number of irregular transitions is even, or if the levels sensed by said first and second means are different and said number of irregular transitions is odd, and b. providing a second output indication if the levels sensed by said first and second means are the same and said number of irregular transitions is odd, or if the levels sensed by said first and second means are different and said number of irregular transitions is even, wherein said memory means is jointly responsive to said detector means and said logic means for separating said regular transitions from said irregular transitions.

2. The invention defined in claim 1 further including means jointly responsive to said detector and memory means for providing a series of timing pulses indicative of the width of said bit intervals.

3. The invention defined in claim 2 wherein said memory means comprises an $n-1$ bit shift register, wherein $n$ is the maximum possible number of said irregular transitions that can be combined in said portion of said bitstream between said first and second sensor means.

4. The invention defined in claim 3 wherein said logic means includes $n$ exclusive OR gates connected in chain-like fashion and an inverter output stage if $m-1<s<m$, where $m$ is an odd integer.

5. Apparatus for reading a binary bitstream having a first level and a second level and wherein regular transitions between said first and second levels occur at the beginning and end of each bit interval and wherein the presence or absence of irregular transitions between said first and second levels occurring intermediate the beginning and end of each of said bit intervals are representative of the data carried by said bitstream, comprising first and second means spaced apart a fixed distance and adapted to simultaneously sense the level of said bitstream thereat, third means adapted to provide an indication of all transitions between said first and second levels, fourth means responsive to said third means and to the data output signal of said apparatus for separating said regular transitions from said irregular transitions, thereby providing an outuput timing signal, fifth means including memory means for storing the data content of the portion of said bitstream between said first and second means, data being moved through said memory means from an input point to an output point under the control of said fourth means, and sixth means jointly responsive to said first and second means and to said memory means for supplying a data signal to said input point only if a. the levels sensed by said first and second means is the same and said data content of said memory means is representative of a first condition, or, b. the levels sensed by said first and second means is different and said data content of said memory means is not representative of said first condition.

6. The invention defined in claim 5 wherein said memory means includes an $n-1$ bit shift register, and $n$ equals the maximum number of said irregular transitions that can occur in said portion of said bitstream between said first and second means.

7. Apparatus for converting a binary bitstream having a. first and second levels b. regular transitions between said first and second levels at the beginning and end of each bit interval, and c. irregular transitions between said first and second levels intermediate said beginning and said end of said bit interval, the presence or absence of said irregular transitions being indicative of the data content of said bitstream, into a first bitstream containing only timing information and a second bitstream containing only data, comprising:

first and second means adapted to simultaneously sense said binary bitstream at two locations spaced apart by a fixed number *n* of bit intervals, memory means for storing the data representative of the preceding *n* bits of said second bitstream, first logic means responsive to said memory means and said first and second sensing means for generating the present bit of said second bitstream, and second logic means for generating said first bitstream containing only timing information by separating said regular transitions from said irregular transitions in response to said first means and said first logic means.

8. Apparatus for reading a binary bitstream having a first level and a second level, wherein the presence of an irregular level transition between level transitions normally occurring at the beginning and end of a bit indicates a first input data state and wherein the absence of an irregular level transition between transitions normally occurring at the beginning and end of a bit indicates a second input data state, comprising first and second sensing means spaced apart a fixed distance and adapted to simultaneously sense the level of said bitstream thereat, third means for providing an indication of all of said level transitions, fourth means responsive to said third means for separating said normally occurring transitions from said irregular transitions, and fifth means jointly responsive to said second and fourth means for generating an output bitstream having first and second output states indicative of said first input data state and said second input data state, respectively.

9. Apparatus for converting an input bitstream encoded in the Aiken code to a first binary bitstream containing only data and a second bitstream containing only timing information, comprising:

first and second means for simultaneously sensing said input bitstream at two locations spaced apart by a fixed distance;

a first logic circuit for generating the present bit of said first bitstream;

a memory circuit for storing the portion of said first bitstream representative of the portion of said input bitstream disposed between said first and second sensing means;

said first logic circuit being jointly responsive to said memory circuit and to said first and second sensing means; and a second logic circuit jointly responsive to said first sensing means and said memory circuit for generating said second bitstream.

10. Apparatus comprising first and second sensors spaced apart a prescribed distance along an axis and responsive independently to each bit of a coded sequence of bits moved along said axis to generate first and second signals respectively, and an electronic circuit responsive to said first and second signals to generate a data stream and a separate clocking signal, said apparatus including means for applying to said circuit in each instance the second signal which corresponds to the bit of said sequence at said first sensor, for providing said data stream and clocking signal.

11. The invention defined in claim 10 wherein said last-mentioned means comprises a memory means for storing the data content of the portion of said sequence of bits between said first and second sensors.

12. Apparatus comprising first and second sensors spaced apart a prescribed distance along an axis and responsive independently to each bit of a coded sequence of bits moved along that axis to generate first and second signals respectively, an electronic circuit responsive to said first and second signals for forming a data stream, means responsive to the output of said circuit and to said second signals which correspond in time to the data version of said coded sequence for generating a clocking signal for said data stream, and a memory means for storing the data content of the portion of said sequence of bits between said first and second sensors and providing an indication of said data content to said circuit.

* * * * *

UNITED STATES PATENT AND TRADEMARK OFFICE

CERTIFICATE OF CORRECTION

PATENT NO. : 3,898,689

DATED : August 5, 1975

INVENTOR(S) : Robert J. D'Orazio and Gerald S. Soloway

It is certified that error appears in the above-identified patent and that said Letters Patent are hereby corrected as shown below:

Column 3, line 9, "00101" should read --"00101"--; line 12, "11010" should read --"11010"--; line 25, "integrated" should read --interpreted--; line 25, "00101" should read --"00101"--; line 38, "ad" should read --and--. Column 7, line 44, "s" should read --"s"--. Column 8, line 21, "combined" should read --contained--.

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*